Oct. 8, 1940.           A. C. HOFFMAN           2,216,839
                 INTERLOCKING SLEEVE COUPLING
               Filed May 15, 1939      2 Sheets-Sheet 1
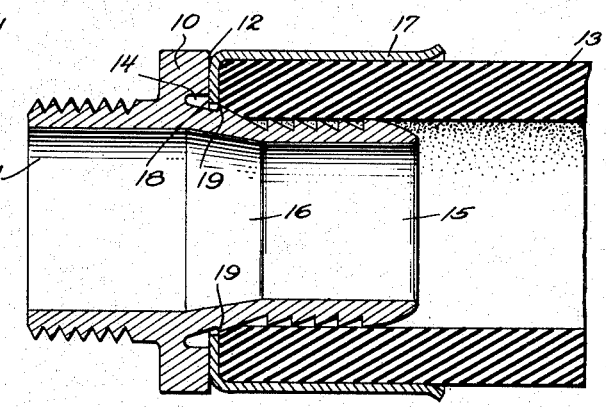
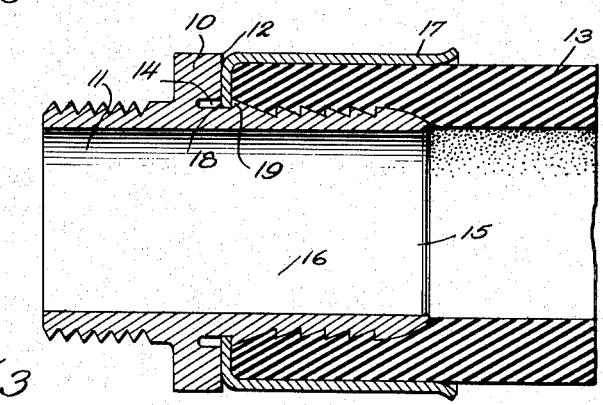
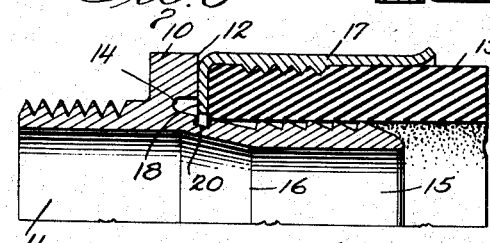  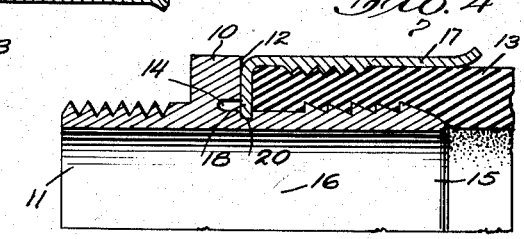
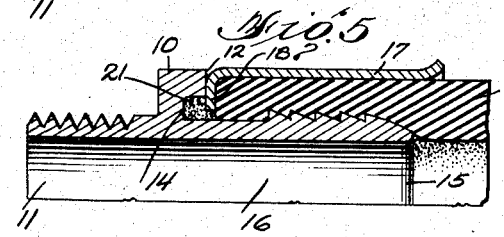  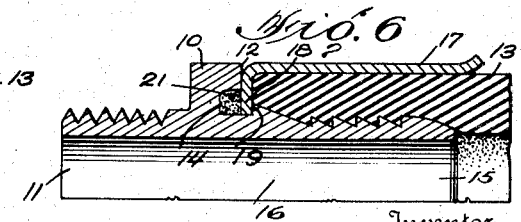
Inventor
Allan C. Hoffman
By Mawhinney & Mawhinney
Attorneys Oct. 8, 1940.　　　A. C. HOFFMAN　　　2,216,839
INTERLOCKING SLEEVE COUPLING
Filed May 15, 1939　　　2 Sheets-Sheet 2
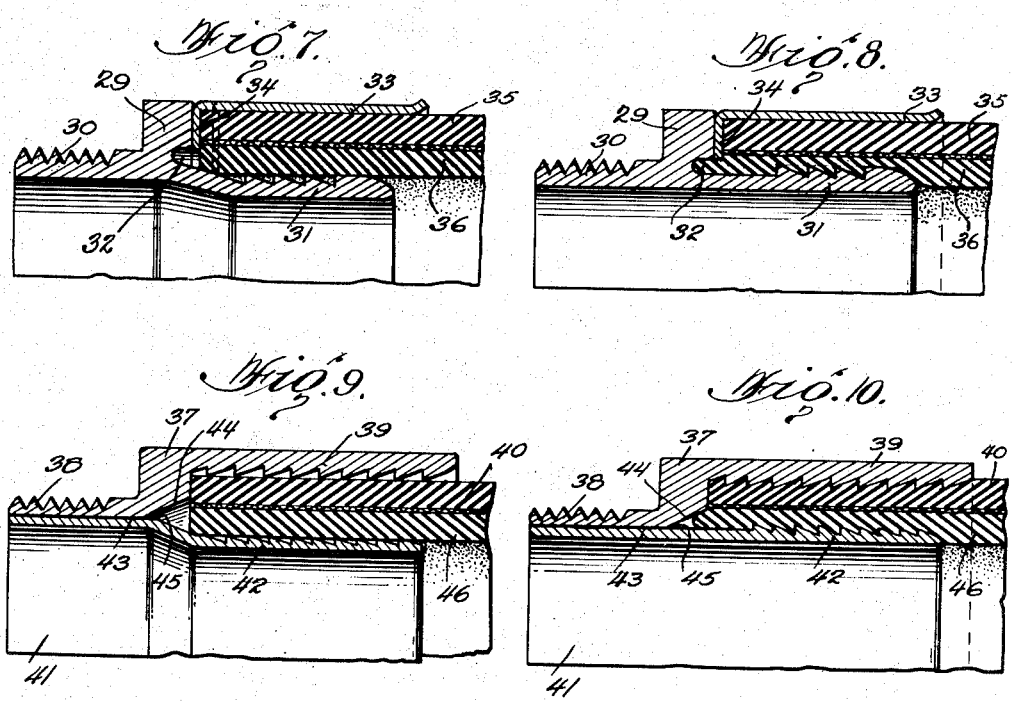

Patented Oct. 8, 1940

2,216,839

UNITED STATES PATENT OFFICE 2,216,839

INTERLOCKING SLEEVE COUPLING

Allan C. Hoffman, Milldale, Conn., assignor to Scovill Manufacturing Company, Waterbury, Conn., a corporation of Connecticut Application May 15, 1939, Serial No. 273,750

7 Claims. (Cl. 285—84)

The present invention relates to hose couplings. One object of the present invention is to provide a novel structure of coupling member having a body portion in one piece with an intermediate flange and a shank extending from one side of the flange and an attached portion at the other side of the flange, such as an integral threaded end. The shank in its unexpanded condition is small enough in diameter to enter the bore of a hose provided with an exterior sleeve or ferrule to embrace the outside and end of the hose, the shank being interlocked with the ferrule during the expansion of the shank to securely bind the hose to the coupling member.

Couplings of this general type have been known for many years as exemplified in the Patent No. 170,457 granted November 30, 1875, to White and the Patent No. 219,032 granted August 26, 1879, to Stewart. In both of these old patents the shank is expanded to compress the hose end in the outer sleeve. In the Stewart patent the outer sleeve is separate from the flange and shank so that upon injury to the coupling the more costly parts may be saved and the damaged parts may be replaced. In the known prior art no attempt has been made for interlocking the sleeve upon the shank and against the flange.

It is another object of this invention to provide a shank and sleeve or ferrule construction wherein the same are interlocked against relative axial movement when the shank is expanded within the hose so that compression of the hose takes place simultaneously with the interlocking action and the sleeve is held against the flange to aid in retaining the hose from pulling off the shank.

Another object of the invention is to provide a flange and shank construction wherein the shank is connected to the flange at a point spaced inwardly of the abutting face of the flange so that that portion of the shank adjacent the hole in the ferrule when abutting the flange, may expand sufficiently to bind tightly against the ferrule or sleeve and interlock with the sleeve, and which, before expansion, admits of the free and easy passage of the sleeve over the shank. This object embodies the feature of recessing the face of the flange adjacent the shank. This provides not only a relatively great amplitude of expansion of the shank at the face of the flange, but also admits of a clamping action of the shank against the sleeve to bind the latter against the flange and provide a solid coupling. This annular groove in the face of the flange about the shank has the further very important function of admitting sliding of the hose on the shank throughout substantially the entire length of the shank as the serrated portion of the shank is initially of a slightly reduced diameter from the inside diameter of the hose and easily enters the open end thereof.

This allows only for the extreme end of the hose to be forced over a relatively short inclined section of the nipple to abut against the flange face. This slight outward expansion of the hose is sufficient to compress the interior material of the hose so that with the expansion of the nipple the hose material will be compressed more tightly and force the same up into the groove to effect a leakproof seal.

A further object of the invention is to provide a hose coupling embodying all of these characteristics and which also provides a full flow passage therethrough without any restrictions or recesses to interfere with the free passage of liquid between the hose and coupling.

A further object of the invention is to provide a novel combined structure of flanged ferrule and coupling member, the shank of the coupling member having means adapted, upon expansion of the shank, to interlock with the flange of the ferrule for holding it and the enclosed hose end securely upon the coupling member and to thus prevent the ferrule and hose from creeping outwardly from the nut of the coupling member; this object or feature of the invention being embodied in a construction, adapted to be secured to the hose not only by internal expansion of the shank, but also by the external compression or reduction of the ferrule, or partly by both the expansion and contraction.

Another feature of the coupling is to provide an annular recess in the face of the flange about the shank and to dispose a compressible packing in the recess so that when the shank is expanded in the hose the packing will be compressed in the recess between the flange, the shank, the hose and the adjacent end of the sleeve, to effectively seal the coupling against ingress of vapor or fluid which might gain access between the nut and the sleeve to the center core of fabric of the conventional hose and seriously weaken the latter.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a longitudinal section taken through a hose coupling constructed according to this invention, showing the shank before expansion and the end of a hose applied thereover ready for clamping in the coupling.

Figure 2 is a like view, showing the shank expanded and the hose clamped in the coupling.

Figure 3 is a longitudinal quarter sectional view taken through a modified form of the coupling, the shank being unexpanded and the hose fitted thereover.

Figure 4 is a similar view, showing the shank expanded and the hose clamped in the coupling.

Figure 5 is a longitudinal quarter sectional view of another modification of the coupling member, showing a sealing washer therein.

Figure 6 is a like view of the structure of Figure 2, but with a sealing washer clamped therein.

Figure 7 is a quarter sectional view taken through the further modified construction of coupling member, showing the end of a hose and a ferrule fitted to the coupling member ready to be secured thereto, and showing a hose having an inner layer of a rubber substitute composition.

Figure 8 is a similar view but with the shank expanded and showing the inner layer or lining of the hose compressed into the cavity of the flange.

Figure 9 is a quarter sectional view of a further modification of coupling member showing the ferrule as an integral part of the flange and showing the shank as an independent drawn tube soldered in the body portion of the coupling, and Figure 10 is a similar view showing the shank expanded and with the inner lining portion of the hose expanded into the annular recess between the shank and the nut.

Referring now to the drawings, and first to Figures 1 and 2, the coupling has a polygonal flange 10 provided at one side with a connecting portion 11, shown as externally threaded in the present instance, for attachment to another hose coupling, a fixed connection or the like. The other side of the flange has a face 12 directed toward the extremity of the hose 13 to which the coupling is attached. The flange 10 has an annular recess or undercut 14 extending axially from the inner marginal edge portion of the face 12 of the flange to a considerable depth toward the connecting portion 11.

The flange 10 adjoins a shank 15 which extends from the bottom of the recess 14 outwardly through the recess and beyond the face 12 of the flange. As this coupling is of the internal expanding type, the shank is initially of reduced diameter, as shown in Figure 1, so that the hose 13 may be easily slipped over it. This reduced size of the shank has a conical portion 16 the larger end of which merges into the flange 10 at the bottom of the recess 14 and adjacent the connecting portion 11. The tapered portion of the shank 16 is short and steep so that the greater length of the shank is of reduced diameter, and the outer surface of the conical section 16 is spaced a considerable distance inwardly of the plane of the face 12 of the flange and provides ample clearance for the end of the hose 13 so that the latter may, without resistance, be advanced over the entire length of the shank 15 and up against the face 12 of the flange.

It should be noted that flexible hose of the type for which this coupling is suited comes in various standard sizes; for example ¾" to 3". These figures refer directly to the diameter of the bore of the hose. This coupling has as one of its prime features a so called full flow characteristic i. e. after the shank has been expanded the inside diameter of the shank is the same as the bore of the body. Obviously if the wall thickness of the shank was small very little expansion would be required but since the amount of expansion is a function of the wall thickness it is practically impossible to use a heavy walled shank which initially has an outside diameter equal to the hose bore and then expand it so that the inside diameter of the shank is equal to the hose bore. The true purpose of the recess 10 is to reduce the angle of taper required. If no recess was employed the angle of taper would be so great that when the expanding punch passed through the shank to expand it excessive strains would be set up sufficient to cause a fracture of the metal.

Or, considered from another view point, if the angle of taper was kept small then the conical section at the flange end would be so long that the hose could not be assembled.

Furthermore, a feature of this coupling is the relatively large amount of compression of the hose and this compression is possible only because of the wall thickness of the shank.

The free end of the hose 13 is sheathed in a sleeve 17 of suitable material, such as malleable metal, and has an inturned flange 18 at one end which is adapted to engage against the extremity of the hose 13.

The flange 18 of the sleeve is adapted to abut against the flange face 12 and is of sufficient depth to approach the tapering part or cone 16 of the shank 15, the inner margin of the flange 18 being disposed for binding engagement on the cone 16 when the latter is expanded, as shown in Figure 2. The edgewise resistance of the flange 18 to the pressure of the cone 16 during expansion insures a firm binding engagement between the shank 15 and the sleeve 17, interlocking these parts together adjacent the flange 10.

When the conical portion 16 of the shank is expanded, it expands outwardly from the bottom of the recess 14 so that the intermediate portion of the cone 16 engages the flange 18 of the ferrule after said intermediate portion is moved through a considerable distance during its expansion. This not only admits the easy placing of the hose 13 over the shank 15 but also provides the necessary leverage of the cone 16 of the shank to lock it to the sleeve.

To insure that the shank 15 will be interlocked with the ferrule or sleeve 17, when the shank 15 is expanded, the cone 16 of the shank may have an annular shoulder or projection 19 on its outer side facing the recess 14 and spaced from the flange face 12 a distance equal substantially to the thickness of the flange 18 of the sleeve. The shoulder 19 is of a height to normally pass through the central opening of the flange 18, and to expand against the inner marginal edge portion of the flange 18 at the side remote from the flange face 12 for not only interlocking engagement with the flange 18 but also for advancing and binding the flange 18 against the nut face 12 as the nipple 15 is expanded. This construction insures that, as the hose 13 is compressed and secured in the sleeve 17 and about the shank 15, the sleeve is held against the flange 10 as the hose is clamped in the sleeve. The result is that the coupling is a tight, permanent one with the hose 13 secured on the entire length of the shank, the hose compressed into binding engagement between the shank and the sleeve and with the sleeve securely locked against the flange 10, the flange 18 assisting in sealing the joint between the flange 10 and the sleeve 17 and covering up and protecting the extremity of the hose against contact with moisture and other foreign matter tending to destroy the hose 13.

The shank 15 may have, as shown, exterior teeth adapted to engage in the inner wall of the hose 13 when the shank is expanded. The outer end of the shank 15, when expanded, acts as a support for the cone 16 to hold it expanded and in interlocking engagement with the sleeve flange 18.

The slight modification in Figures 3 and 4 discloses an annular groove 20 in the exterior wall of the cone 16 which takes the place of the shoulder 19. The groove 20 provides a shoulder as the groove embraces the inner marginal edge of the flange 18 and locks the flange to the shank and against the face 12 of the flange.

If desired a compressible sealing or packing gasket 21 may be seated in the recess 14 so that when the shank 15, with its cone 16, is expanded the recess 14 is reduced in cross sectional area and the gasket 21 is compressed into sealing contact with the flange 10, the flange 18 and the shank 15. Moisture and foreign matter are thus effectively excluded from between the flange 10 and the sleeve 17. The gasket 21 is shown in Figure 5 as applied to a coupling wherein the shoulder 19 and groove 20 are omitted, the compression of the hose 13 within the sleeve 17 being supplemented by the compressed gasket 21 to hold and seal the hose on the coupling. The packing 21 is shown in Figure 6 as applied to the first form of coupling illustrated in Figures 1 and 2. In this form the gasket 21 is compressed wholly within the recess 14 and against the adjacent side of the flange 18 of the sleeve.

In Figures 7 and 8 the coupling member has the flange 29 with the threaded end 30 and with an initially reduced shank 31. The flange 29 has in its face an annular groove or recess 32 which is provided at the base of the flange and about the connecting portion of the shank 31 as shown, the recess or groove 32 admitting of the free expansion of the shank throughout a substantial distance and adjacent to the outer side of the flange 27. The coupling member is provided with a ferrule 33 having a flange 34 which abuts the coupling member flange 29 and is of a depth corresponding to the outer face of the flange 29 and terminates substantially flush with the outer wall of the recess 32. The flange 34 of the ferrule not only overlaps the end of the hose 35 and holds the end portion of the hose against expansion toward the body flange 29 but permits the expansion of the inner layer 36 of the hose into the recess or groove 32 when the shank 31 is open, as shown in Figure 8. The inner lining or section 36 of the hose may be of a rubber substitute so as to withstand the action of hydrocarbons and the like which pass through the hose and the coupling, and when the coupling is formed, as shown in Figure 8, this inner lining of resisting material is compressed into the groove 32 and forms an effective seal between the hose end and the coupling, and a seal which comprises a suitable repellent capable of maintaining the seal in effective condition.

In the further modified form shown in Figures 9 and 10 the body portion of the coupling is provided with a flange 37 having at one side the threaded end 38 or the like, and at its other side is provided with an integral ferrule 39 which projects axially from the outer marginal edge portion of the flange 37. The ferrule 39 may have internal threads or shoulders as shown for receiving therein the end of a hose 40. The body portion of the coupling member also has a drawn tube 41 which has one end soldered within the thread attaching end 38 and it has its other end reduced in diameter to provide a shank 42 for engagement in the bore of the hose 40. The exterior surface of the shank 42 may be provided with a plurality of teeth or threads facing those of the ferrule 39. The reduction or offset of the drawn tube, to provide the shank 42, originates within the flange 36 as shown at 43, and the inner edge 44 of the flange is beveled or flared as shown in Figure 9 oppositely to the conical portion of the shank 42 to provide therewith an outwardly flaring groove or recess 45 at the face of the flange 37. As shown in Figure 10, the inner layer 46 of hose is compressed into the groove 45 when the shank 42 is expanded so as to provide an effective and long enduring seal for the hose on the coupling member.

While a hose with an inner layer of a rubber substitute composition is shown only in Figures 7 to 10, it is to be understood that this type of hose may be used in any other form of the invention, each as in the forms shown in Figures 1 to 6, and the other forms of hose may be used with any of the couplings of this invention: the particular combinations herein shown and described being merely for illustrative purposes.

It will be noted that this coupling admits the use of a particular standard size body or shank for insertion in the end of a hose of a predetermined standard bore or internal diameter, and a set of cooperating sleeves varying in diameter according to different wall thicknesses of the hose so that one of the sleeves may be selected according to the external diameter of the hose.

It is obvious that various changes and modifications may be made in the details of construction and design of the above specifically described embodiment of this invention without departing from the spirit thereof, such changes and modifications being restricted only by the scope of the following claims.

What is claimed is:

1. A hose coupling, comprising a coupling body having a flange with a reduced diameter shank at one side and an annular relatively deep undercut recess in the face of the flange about the shank, a flanged sleeve adapted to embrace the end of a hose and to be fitted with the hose over the shank, and a compressible packing disposed in said recess about the shank, said shank adapted to be expanded in the hose and body flange to compress the hose in the sleeve and compress the packing in the recess of the body flange for sealing the joint between the same and the shank and the hose with its flanged sleeve.

2. In that type of coupling which is interlocking and in which the two members of the coupling have abutting faces with one member having a portion expansible relatively to the other member and having a part which on expansion interlocks with the other member, said coupling being characterized in that the member having said expansible portion is provided with a recess immediately outward of the connection of said expansible portion with its member, said recess opening on the abutting faces and shifting the effective fulcrum point about which the expansible portion moves outwardly axially along the coupling in a direction spaced from the line of said abutting faces in a direction opposite to the extension of said expansible part adapted to produce a relatively long radius of movement for said interlocking part to achieve complete interlocking engagement of the members.

3. An improved sleeve coupling wherein the two members of the coupling have mutually abutting faces with one of the members having an outwardly expansible nipple forming with the other member a well in which to receive the end portion of a hose section to be squeezed against said other member when the nipple is expanded, characterized by the fact that there is produced in the nipple member a recess opening through said member on the abutting line between the two members, said recess extending immediately outward of said nipple and of substantial axial length concentric with the inner portion of the nipple which connects with said member to afford clearance space into which the inner portion of the nipple may move on the expanding movement of the nipple.

4. An improved sleeve coupling comprising two coupling members having inner and outer walls forming a well, one of said members having a substantially flat abutment face forming the bottom of said well, said abutment face being substantially normal to said outer wall and adapted to receive thereagainst the terminal end of a hose received into said well, said abutment member having a recess therein opening through said abutment face and progressing axially inward from said face, said inner wall being expansible and having fulcrum connection with the abutment member at the bottom of said recess.

5. A coupling body for a hose coupling comprising a connecting end, an intermediate flange and a nipple portion for insertion into the end of the hose, the inner face of said flange serving as an abutment for the end of the hose and having a recess extending axially of said face into said flange, the inner end of said nipple being tapered starting from the base of said recess and extending a substantial distance beyond said face.

6. An improved hose coupling comprising a flanged member having a connecting part extending out axially in one direction therefrom and an expansible nipple extending from the flange in the other axial direction, a ferrule spaced concentrically outward of said expansible nipple, and a hose having its end received within the space between said ferrule and nipple and squeezed between these two parts when the nipple is expanded, said flange having a recess therein opening through the face of the flange adjoining said nipple and acting to shift the point of attachment of the nipple appreciably into said flange at the bottom of said recess.

7. A coupling comprising a member having an external flange with a nipple extending therefrom in one direction and an attaching sleeve extending in the opposite axial direction, a ferrule disposed concentrically outward of said nipple, a hose having its end fitted in the space between said nipple and ferrule, said flange having a recess opening through the face thereof adjacent the hose end and lying immediately concentrically outward of the inner end portion of said nipple, said nipple composed of adjoining axial sections, one such section being frusto-conical with its wider base portion hingedly connecting with said flange at the base portion only of said recess, another section of said nipple being of reduced diameter compared to the internal diameter of the hose and extending off the smaller end of the frusto-conical section, said sections of the nipple being expansible outwardly against the hose end.

ALLAN C. HOFFMAN.